US009690154B2

(12) United States Patent
Yamayoshi et al.

(10) Patent No.: US 9,690,154 B2
(45) Date of Patent: Jun. 27, 2017

(54) LIQUID CRYSTAL DISPLAY PANEL AND METHOD OF MANUFACTURING THE SAME

(71) Applicant: MITSUBISHI ELECTRIC CORPORATION, Tokyo (JP)

(72) Inventors: Kazushi Yamayoshi, Kumamoto (JP);
Osamu Miyakawa, Kumamoto (JP);
Takeshi Sonoda, Kumamoto (JP);
Shinsuke Ogata, Kumamoto (JP);
Takeshi Shimamura, Tokyo (JP);
Naruhito Hoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/067,572

(22) Filed: Oct. 30, 2013

(65) Prior Publication Data

US 2014/0146262 A1   May 29, 2014

(30) Foreign Application Priority Data

Nov. 29, 2012 (JP) ................................. 2012-260573

(51) Int. Cl.
*G02F 1/1362* (2006.01)
*G02F 1/1343* (2006.01)

(52) U.S. Cl.
CPC .. *G02F 1/136227* (2013.01); *G02F 1/134363* (2013.01)

(58) Field of Classification Search
CPC ......... G02F 1/136227; G02F 1/134363; G02F 1/13439; G02F 1/1362; G02F 1/136209;
(Continued)

(56) References Cited

U.S. PATENT DOCUMENTS 7,053,972 B2 *   5/2006   Lim ............................. 349/152
7,630,045 B2 *  12/2009   Matsumoto ....... G02F 1/134363
                                                   349/114

(Continued)

FOREIGN PATENT DOCUMENTS

JP    2004-004680 A    1/2004
JP    2009-109930 A    5/2009
(Continued)

OTHER PUBLICATIONS

English translation of JP 2010139803 A, Title: Liquid Crystal Display, Author: Tomikawa, Naoki; Date of publication: Jun. 24, 2010.*

(Continued)

*Primary Examiner* — Dung Nguyen
*Assistant Examiner* — Shan Liu
(74) *Attorney, Agent, or Firm* — Studebaker & Brackett PC

(57) ABSTRACT

A liquid crystal display panel includes: a transparent insulating substrate; a signal line and a scanning line arranged in a display region on the transparent insulating substrate and crossing each other in a matrix; a protective insulating film arranged so as to cover at least the signal line and the scanning line from above; a first insulating film that covers the protective insulating film from above; and a first contact hole that penetrates at least the first insulating film and the protective insulating film to reach a surface of a common interconnect. The first contact hole has a bottom and an inner side surface covered with a first stacked film composed of a first transparent conductive film made of the same material as the lower electrode and a second transparent conductive film made of the same material as the upper electrode.

11 Claims, 8 Drawing Sheets

(58) Field of Classification Search
CPC ............. G02F 1/1365; G02F 1/1368; G02F
2001/136218; G02F 2001/136222; G02F
2001/136231; G02F 2001/13625; G02F
2001/1635; G02F 2201/122; G02F
2202/10; G02F 1/1343; G02F 1/134309;
G02F 1/136286; G02F 1/155; G02F
1/1393; G02F 1/1395; G02F 1/136; G02F
1/218; G02F 1/134327; G02F 1/133707;
G02F 1/134336; G02F 1/0316; G02F
2001/134318; G02F 2001/134372; G02F
2001/134381; G02F 2001/134345; G02F
2001/1357; G02F 2001/136295; G02F
2001/1552; G02F 2001/1555; G02F
2001/1557; G02F 2001/13629; G02F
2201/12; G02F 2201/121; G02F
2201/124; G02F 2201/123; G02F
2201/14; G02F 1/133753; G02F 1/3775;
H01L 2021/775; H01L 27/2436; H01L
29/66037; H01L 29/66068; H01L
29/66227; H01L 29/72; H01L 29/786;
H01L 2924/1304; H01L 51/0504; H01L
51/0508; H01L 27/1214–27/1296; H01L
27/3276; H01L 27/3297; H01L 27/3279;
H01L 27/329; H01L 23/49534; H01L
2933/0016; G09G 2300/0421; G09G
2300/0426; G09G 2300/0439; G09G
3/3659
USPC ......... 349/42, 43, 139–148, 129; 257/59, 72
See application file for complete search history.

(56) References Cited

U.S. PATENT DOCUMENTS

| 7,791,695 | B2 | 9/2010 | Toyota et al. | |
| 7,952,671 | B2* | 5/2011 | Aota et al. | 349/141 |
| 2002/0084419 | A1* | 7/2002 | Choo | H01L 27/12 250/370.01 |
| 2006/0256270 | A1* | 11/2006 | Nakayoshi | G02F 1/1343 349/141 |
| 2008/0055526 | A1* | 3/2008 | Ino | G02F 1/133555 349/114 |
| 2009/0059110 | A1* | 3/2009 | Sasaki et al. | 349/39 |
| 2009/0115950 | A1* | 5/2009 | Toyota | G02F 1/136213 349/114 |
| 2011/0050551 | A1* | 3/2011 | Ota | G02F 1/134363 345/87 |
| 2012/0069425 | A1* | 3/2012 | Sato | G09G 3/3446 359/296 |
| 2013/0128187 | A1* | 5/2013 | Matsui | G02F 1/1303 349/61 |
| 2013/0214299 | A1* | 8/2013 | Ryu | H01L 27/1225 257/88 |
| 2014/0340607 | A1* | 11/2014 | Nakata | H01L 29/7869 349/46 |
| 2014/0346504 | A1* | 11/2014 | Misaki | H01L 21/0217 257/43 |
| 2015/0108467 | A1 | 4/2015 | Moriguchi et al. | |

FOREIGN PATENT DOCUMENTS

| JP | 2010-085551 A | | 4/2010 |
| JP | 4487318 B2 | | 4/2010 |
| JP | 2010139803 A | * | 6/2010 |
| JP | 2010-145457 A | | 7/2010 |
| WO | 2012/086513 A1 | | 6/2012 |

OTHER PUBLICATIONS

An Office Action; "Notice of Reasons for Rejection," issued by the Japanese Patent Office on Jun. 21, 2016, which corresponds to Japanese Patent Application No. 2012-260573 and is related to U.S. Appl. No. 14/067,572; with English language partial translation.

* cited by examiner

F I G. 1
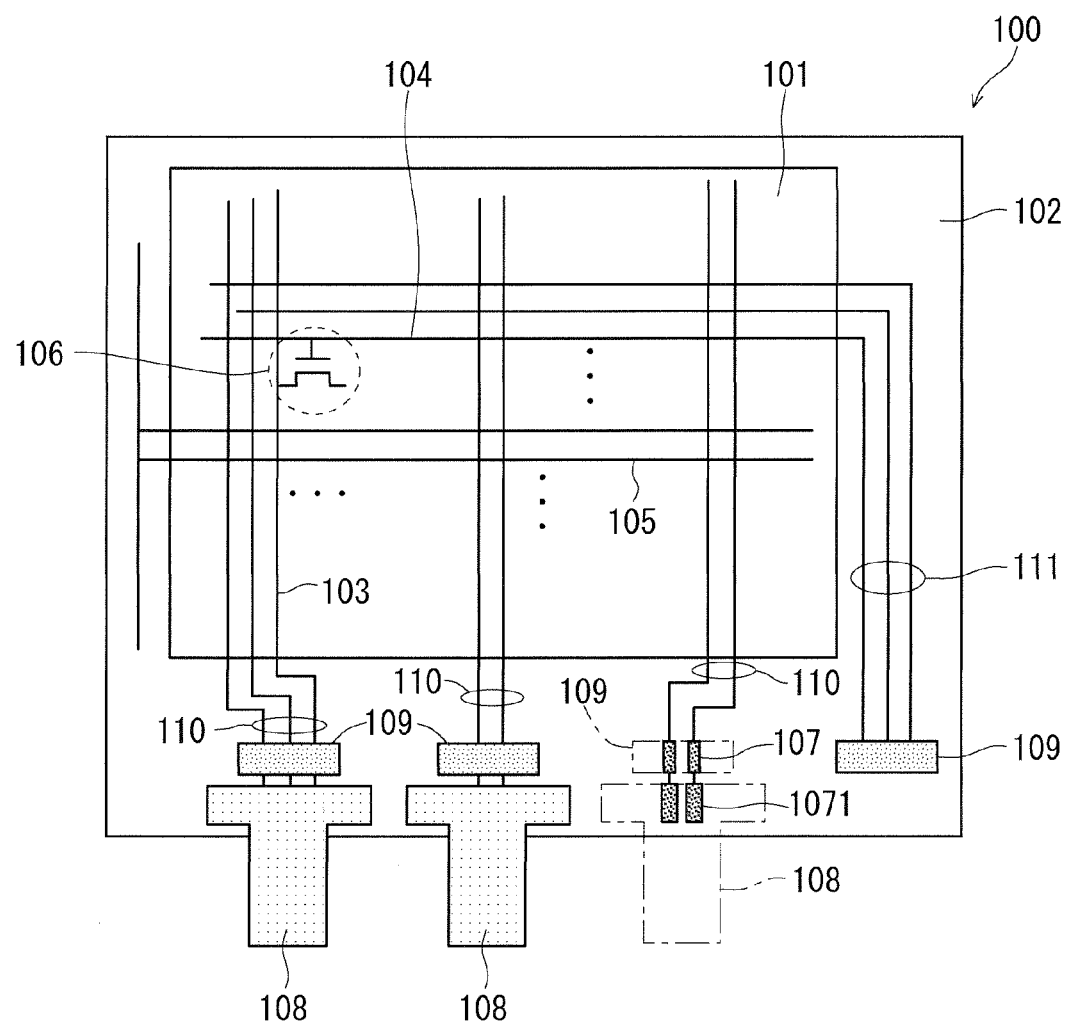

(a)

(b)

LIQUID CRYSTAL DISPLAY PANEL AND METHOD OF MANUFACTURING THE SAME

FIELD OF THE INVENTION

The present invention relates to a liquid crystal display panel forming a liquid crystal display and a method of manufacturing the liquid crystal display panel.

BACKGROUND ART

A TN (twisted nematic) mode has widely been used as one of display systems for a liquid crystal display. However, the TN mode has been replaced by a lateral electric field system in recent years that applies a voltage between a pixel electrode and an opposed electrode to generate an electric field in a direction substantially horizontal to a panel, thereby driving liquid crystal molecules in a horizontal direction.

The lateral electric field system works advantageously for wider viewing angles, higher resolution and higher brightness, and is considered to become the mainstream of medium and small sized panels represented by smartphones and tablets, for example.

The lateral electric field system includes known modes such as an IPS (in-plane switching) mode and an FFS (fringe field switching) mode. In the FFS mode, a lower electrode and an upper electrode with a slit are arranged while an insulating film is placed therebetween. One of the upper and lower electrodes functions as a pixel electrode and the other electrode functions as an opposed electrode. An electric field is generated in a direction from the slit of the upper electrode toward a liquid crystal above the upper electrode. The electric field thereby generated drives the liquid crystal.

In a display region of an active-matrix liquid crystal display, a thin-film transistor is formed below a lower electrode while a protective insulating film is provided between the lower electrode and the thin-film transistor. Regarding application of a voltage, an arbitrary control signal (voltage) is applied to the thin-film transistor from outside via a signal line to turn on the thin-film transistor. In response, a predetermined voltage is applied to the lower or upper electrode via a contract hole formed in the protective insulating film. Japanese Patent No. 4487318 describes an example of such a liquid crystal display panel.

In the aforementioned structure, if a conductive layer formed inside the contact hole in the protective insulating film and an electrode of the thin-film transistor are not connected stably, an electric field is not generated normally between the lower and upper electrodes, leading to display failure in some cases.

Hence, the lower and upper electrode are each composed of a transparent conductive film of a thickness of 100 nm or less in order to increase the transparency of the transparent conductive film.

This forms an interconnect inside the contact hole composed of the thin transparent conductive film, and this transparent conductive film is further formed on an electrode surface of the thin-film transistor at the bottom of the contact hole.

The contact hole is small in width so the coating performance of the transparent conductive film is reduced at the inner side wall of the contact hole. Hence, with the intention of preventing cut of the transparent conductive film at a stepped part (step cut), extreme care should be taken so as to maintain a sufficient thickness of the transparent conductive film on a part hard to cover with the transparent conductive film.

In the liquid crystal display panel disclosed in Japanese Patent No. 4487318, a contact hole to be formed in the protective insulating film (passivation film) (contact hole in the protective insulating film), and a contact hole to be formed in a planarized film composed of an organic film and covering the protective insulating film (contact hole in the planarized film), are provided separately.

As a result, the contact hole in the planarized film is formed inwardly of the contact hole in the protective insulating film, and the transparent conductive film is formed on the side wall of the contact hole in the planarized film and on the electrode surface, as shown in FIG. 5.

According to a method of manufacturing the liquid crystal display panel disclosed in Japanese Patent No. 4487318, the contact hole in the planarized film is formed by dry etching. More specifically, a resist mask is formed, and selectivity between the resist and the planarized film (ratio between the respective etching amounts) is adjusted under conditions for the dry etching. This can form the contact hole in the planarized film into a tapered shape (shape where an opening part is larger in area than the bottom) relatively easily. This shape achieves favorable coating performance of the transparent conductive film. The aforementioned method can also form a contact hole in a planarized film made of a photosensitive material into the same shape.

In the liquid crystal display panel disclosed in Japanese Patent No. 4487318, however, a metal film as an electrode of the thin-film transistor and the planarized film directly contact each other, as shown for example in FIG. 10. The planarized film composed of an organic film and the like contains a slight amount of water and this water may generate corrosion of the metal film. Additionally, the planarized film on the metal film generally does not have strong adhesive force so it may become separated in some cases. Separation of the planarized film may generate a step cut of the transparent conductive film.

A material for the metal film and that for the planarized film should be limited in order to avoid the aforementioned problems. Thus, it is preferable that the protective insulating film cover the metal film from above to prevent contact between the metal film and the planarized film. To be specific, the protective insulating film is provided with the intention of shielding water and enhancing the adhesive force of the planarized film. Thus, a silicon nitride (SiN) film is suitable as the protective insulating film.

Preferably, a contact hole is formed in the planarized film on the protective insulating film in order to prevent contact between the metal film and the planarized film.

An SiN film is etched at a high etching rate. Hence, if the protective insulating film is composed of the SiN film for the aforementioned reason, the contact hole in the protective insulating film is formed into an upright shape and cannot be formed into a tapered shape easily, unlike the contact hole in the planarized film.

Additionally, a surface of the metal film at the bottom of the contact hole may be roughened to generate a gap (notch) in the outer circumference of the bottom of the contact hole. In this case, the coating performance of the transparent conductive film may be degraded at the gap to generate a step cut of the transparent conductive film, leading to the probability of display failure.

SUMMARY OF THE INVENTION

It is an object of the present invention to provide a liquid crystal display panel and a method of manufacturing the same capable of preventing a step cut of a transparent conductive film inside a contact hole.

According to the present invention, a liquid crystal display panel includes: a transparent insulating substrate; a signal line and a scanning line arranged in a display region on the transparent insulating substrate and crossing each other in a matrix; a common interconnect arranged so as to extend in parallel with the signal line or the scanning line; a protective insulating film arranged so as to cover at least the signal line and the scanning line from above; a first insulating film that covers the protective insulating film from above; a lower electrode and an upper electrode arranged one above the other to be opposed to each other above the first insulating film; and a first contact hole that penetrates at least the first insulating film and the protective insulating film to reach a surface of the common interconnect. The first contact hole has a bottom and an inner side surface covered with a first stacked film composed of a first transparent conductive film made of the same material as the lower electrode and a second transparent conductive film made of the same material as the upper electrode.

In this liquid crystal display panel, the first contact hole has a bottom and an inner side surface covered with the first stacked film composed of the first transparent conductive film made of the same material as the lower electrode and the second transparent conductive film made of the same material as the upper electrode. This can prevent a step cut of a transparent conductive film inside the first contact hole.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing a planar structure of a liquid crystal display panel of a preferred embodiment of the present invention;

EMBODIMENT FOR CARRYING OUT THE INVENTION

Figure 2:
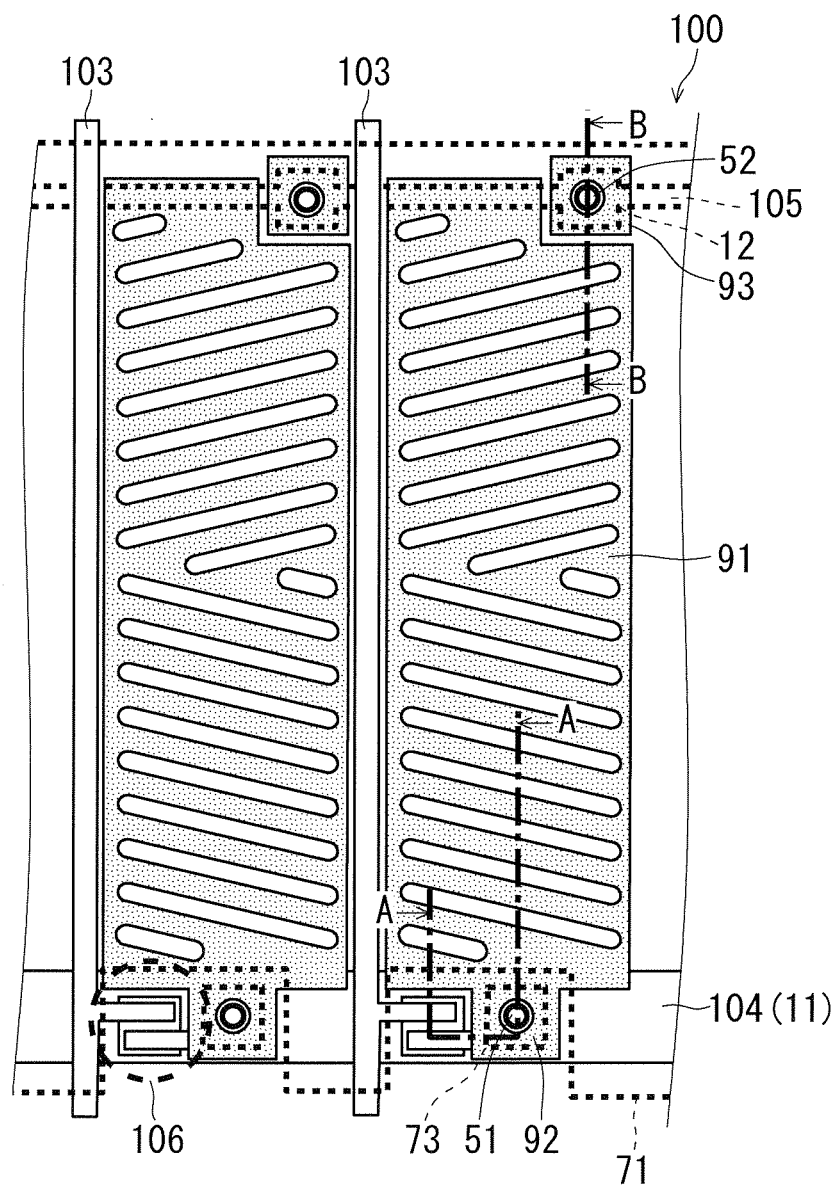
FIG. 2 is a plan view showing the structure of a pixel part in a display region.

In a first preferred embodiment of the present invention described below, the present invention is applied to a liquid crystal display panel of an FFS (fringe field switching) mode.

<Device Structure>

FIG. 1 is a plan view showing a planar structure of a liquid crystal display panel 100 of a preferred embodiment of the present invention. FIG. 1 is a schematic view, so that it does not reflect an actual size and the like of a component shown therein. To prevent complication, a part except for those relevant to the present invention is omitted, and some of these relevant parts are simplified in FIG. 1.

As shown in FIG. 1, the liquid crystal display panel 100 is broadly divided into a display region 101 in which an image is displayed and a frame region 102 surrounding the display region 101.

The display region 101 includes a plurality of signal lines 103 and a plurality of scanning lines 104. The signal lines 103 and the scanning lines 104 extend to be perpendicular to each other. A plurality of common interconnects 105 is provided in parallel with the scanning lines 104. A region surrounded by adjacent signal lines 103 and the scanning line 104 form one pixel part. Accordingly, the display region 101 includes a plurality of pixel parts arranged in a matrix.

A thin-film transistor 106 is arranged at an intersection between the signal line 103 and the scanning line 104. One thin-film transistor 106 is provided in one pixel.

The frame region 102 includes a plurality of mount terminals 107 to which pulled-out interconnects 110 extending from the signal lines 103 in the display region 101 and pulled-out interconnects 111 extending from the scanning lines 104 in the display region 101 are connected, and a plurality of external connection terminals 1071 connected to the corresponding mount terminals 107. The common interconnects 105 are tied in the frame region 102 and receive a common potential.

An IC (integrated circuit) chip 109 for signal control is connected to the corresponding mount terminals 107. Interconnect substrates 108 such as FPCs (flexible printed circuits) are connected to the corresponding external connection terminals 1071.

FIG. 2 is a plan view showing the structure of the pixel parts in the display region 101. The present invention relates to the structure of what is called a TFT substrate, so that a color filter substrate arranged to be opposed to the TFT substrate will not be described and will not be shown in the drawings.

As shown in FIG. 2, the pixel parts each include a pixel electrode 91 and an opposed electrode 71 arranged one above the other. A voltage is applied between the pixel electrode 91 and the opposed electrode 71 to generate an electric field in a direction substantially horizontal to the liquid crystal display panel 100. This drivers liquid crystal molecules in a horizontal direction to realize display of an image.

In order to apply a display voltage to the pixel electrode 91 based on signal data input from outside, the thin-film transistor 106 is arranged on a transparent insulating substrate (not shown in FIG. 2) on the lower side of the pixel electrode 91 and the opposed electrode 71.

The thin-film transistor 106 has a gate electrode connected to the scanning line 104, and a source electrode connected to the signal line 103. A protective insulating film (not shown in FIG. 2) is provided on the transparent insulating substrate. The pixel electrode 91 is electrically connected to a drain electrode (not shown in FIG. 2) via a contact hole 51 formed in the protective insulating film. The opposed electrode 71 is electrically connected to the common interconnect 105 via a contact hole 52 formed in the protective insulating film.

If a control signal is supplied via the scanning line 104 in the aforementioned structure, a current starts to flow from the source electrode into the drain electrode of the thin-film transistor 106. To be specific, a voltage determined based on signal data supplied via the signal line 103 is applied to the pixel electrode 91. The pixel electrode 91 has a plurality of slits in order for an electric field generated in response to the voltage determined based on the signal data to go up.

The signal data supplied via the signal line 103 is given from the IC chip 109 connected to the mount terminal 107 in the frame region 102 or from the interconnect substrate 108 connected to the external connection terminal 1071. A voltage responsive to display data is applied to the pixel electrode 91.

Figure 3:
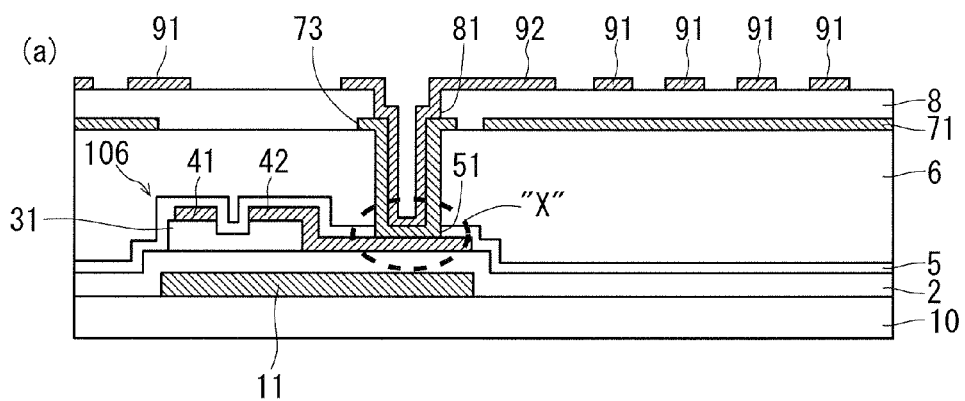
FIGS. 3 and 4 are sectional views each showing a partial structure of the pixel part.
Figure 3:
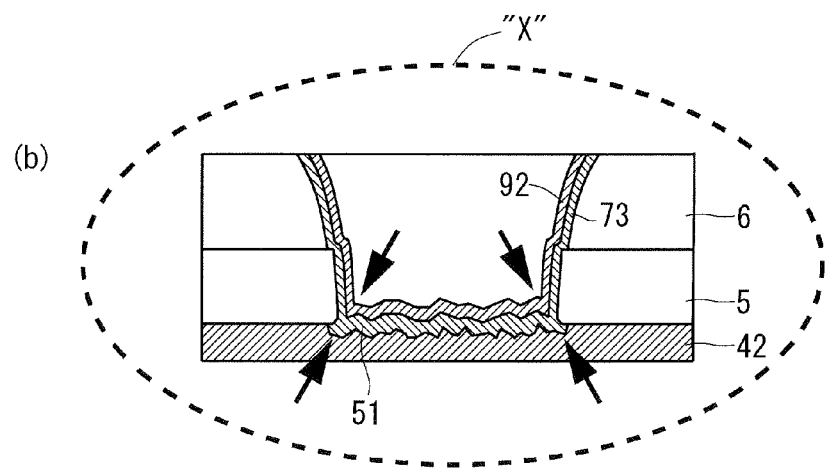
Figure 4:
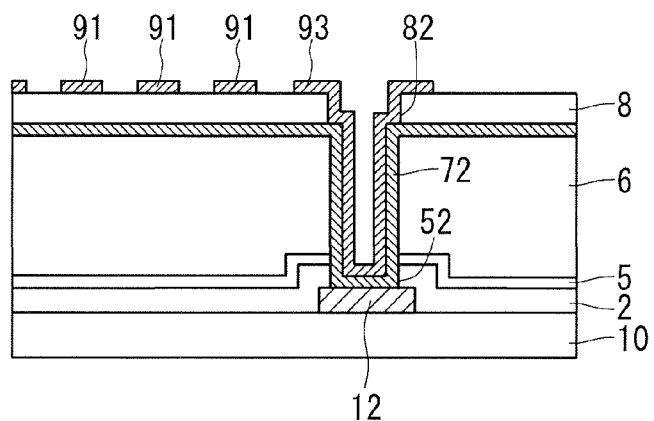
Figure 5:
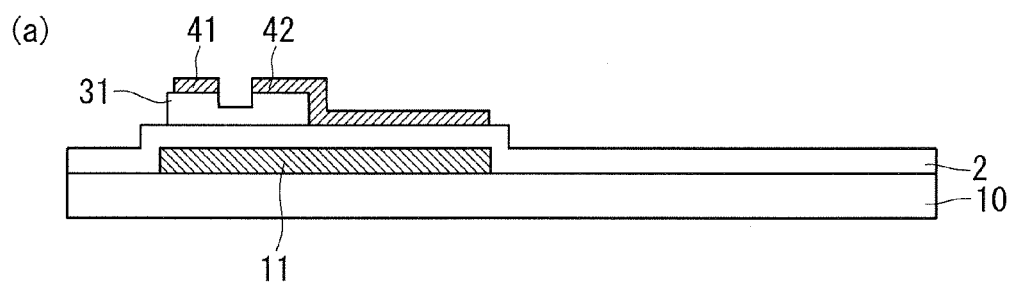
FIGS. 5 to 10 are sectional views each showing a step of manufacturing the liquid crystal display panel of the preferred embodiment of the present invention.
Figure 5:
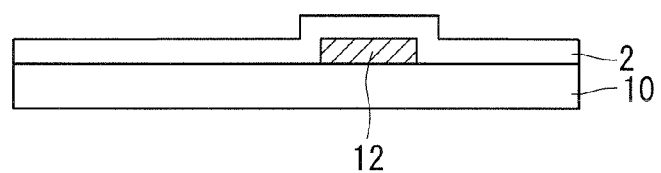

Next, the structure in cross section of the pixel part is described by using FIGS. 3 and 4. In (a) portion of FIG. 3 is a sectional view along line A-A taken from arrows of FIG. 2. FIG. 4 is a sectional view along line B-B taken from arrows of FIG. 2.

As shown in (a) portion of FIG. 3, a gate electrode 11 is formed in a region on a transparent insulating substrate 10 in the display region 101 and where the thin-film transistor 106 is formed. The scanning line 104 extending from the gate electrode 11 and a common interconnect pad 12 extending from the common interconnect 105 arranged in parallel with the scanning line 104 are further formed on the transparent insulating substrate 10 in the display region 101.

A gate insulating film 2 is formed so as to cover the gate electrode 11, the scanning line 104, the common interconnect 105, and the common interconnect pad 12. An SiN film may be used as the gate insulating film 2, for example.

An insular semiconductor film 31 is provided in a region above the gate electrode 11 so as to contact the gate insulating film 2.

The semiconductor film 31 is composed of any one of amorphous silicon, microcrystalline silicon and polycrystalline silicon, or of a silicon semiconductor film including a combination of stacked layers made of two or more of these materials, or of an oxide semiconductor film.

The semiconductor film 31 is divided into a source region and a drain region while a channel region is defined therebetween. A source electrode 41 and a drain electrode 42 are formed on the source and drain regions respectively.

As a result, the thin-film transistor 106 is composed of the gate electrode 11, the semiconductor film 31, and the source and drain electrodes 41 and 42.

The signal line 103 (FIG. 2) composed of a metal film made of the same material as the source and drain electrodes 41 and 42 is formed on the gate insulating film 2. A protective insulating film 5 is formed so as to entirely cover the thin-film transistor 106 and the signal line 103 from above.

The protective insulating film 5 is an inorganic insulating film that may either be a single-layered film composed of an SiN film or a multi-layered film (composed of an SiO film and an SiN film).

A planarized film 6 is formed on the protective insulating film 5. The SiN film prevents degradation of the characteristics of the thin-film transistor 106 due to water entering from the planarized film 6, for example. The planarized film 6 may be omitted, and only the protective insulating film 5 composed of the SiN film may be provided.

The planarized film 6 is composed of an organic resin film mainly containing acrylic or an SOG (spin-on-glass) film. The reason is as follows. Noise from the signal line 103 may affect the pixel electrode 91 to reduce display quality. An acrylic resin film or an SOG film has a dielectric constant $\in$ of from about three to four lower than that of an SiN film of from six to seven. In this way, the acrylic resin film or the SOG film reduces a parasitic resistance, thereby allowing suppression of the influence by the noise.

An acrylic resin has high transparency, can be obtained at low cost, is easy to handle as it becomes applicable as a coating film by dissolving in an organic solvent, and can be sintered at a relatively low temperature.

An $SiO_2$ film formed by process such as CVD process or sputtering process has a dielectric constant $\in$ similar to that of an SOG film. However, the $SiO_2$ film cannot be planarized as easy as the SiN film.

The opposed electrode 71 composed of a first transparent conductive film made of ITO (indium tin oxide) or IZO (indium zinc oxide) is formed on a planar surface of the planarized film 6. An interlayer insulating film 8 is formed on the planarized film 6 so as to cover the opposed electrode 71. The pixel electrode 91 composed of a second transparent conductive film made of ITO or IZO is formed on the interlayer insulating film 8.

The contact hole 51 is formed so as to penetrate the protective insulating film 5 on the drain electrode 42 to reach the drain electrode 42. Further, as shown in FIG. 4, the contact hole 52 is formed so as to penetrate the gate insulating film 2 and the protective insulating film 5 above the common interconnect pad 12.

As shown in (a) portion of FIGS. 3 and 4 respectively, the contact holes 51 and 52 are formed in the planarized film 6 on the protective insulating film 5 in order for metal films such as the drain electrode 42 and the common interconnect pad 12 not to contact the planarized film 6 directly. This can prevent corrosion of metal films forming the drain electrode 42 and the common interconnect pad 12 due to water in the planarized film 6. The protective insulating film 5 is exposed at respective inner side surfaces of the contact holes 51 and 52 near the bottom surfaces thereof. The planarized film 6 is exposed at these inner side surfaces above the protective insulating film 5.

As shown in FIG. 4, the opposed electrode 71 is electrically connected to the common interconnect pad 12 via the transparent conductive film 72 extending from the opposed electrode 71 and the contact hole 52. To be specific, the transparent conductive film 72 extending from the opposed electrode 71 covers the inner side surface of the contact hole 52 and a surface of the common interconnect pad 12 exposed at the bottom surface of the contact hole 52, thereby electrically connecting the common interconnect pad 12 and the opposed electrode 71.

The opposed electrode 71 is further electrically connected via a contact hole 82 in the interlayer insulating film 8 formed above the contact hole 52 to a transparent conductive film 93 made of the same material as the pixel electrode 91 and formed in the same layer as the pixel electrode 91. To be specific, the transparent conductive film 93 covers the transparent conductive film 72 from above that covers the inner surface of the contact hole 52, so that the inner side surface and the bottom of the contact hole 52 are covered with a stacked film composed of the transparent conductive films 72 and 93.

The transparent conductive film 93 and the pixel electrode 91 are electrically independent so that they are not electrically connected to each other.

As shown in (b) portion of FIG. 3, a transparent conductive film 73 made of the same material as the opposed electrode 71 and formed in the same layer as the opposed electrode 71 is formed so as to cover the inner side surface of the contact hole 51 and a surface of the drain electrode 42 exposed at the bottom of the contact hole 51.

The transparent conductive film 73 and the opposed electrode 71 are electrically independent so that they are not electrically connected to each other.

The pixel electrode 91 is electrically connected via a contact hole 82 in the interlayer insulating film 8 formed above the contact hole 51 to the transparent conductive film 73 that covers the inner surface of the contact hole 51, thereby electrically connecting the pixel electrode 91 and the drain electrode 42. To be specific, a transparent conductive film 92 extending from the pixel electrode 91 covers the inner side surface of the contact hole 81 and further covers the transparent conductive film 73 from above that covers the inner surface of the contact hole 51. As a result, the inner side surface and the bottom of the contact hole 51 are covered with a stacked film composed of the transparent conductive films 73 and 92.

The contact holes 81 and 82 in the interlayer insulating film 8 are formed to have openings larger than those of the contact holes 51 and 52 in the protective insulating film 5 respectively.

As a result, the inner surface of the contact hole 52 can be covered with a stacked film composed of the transparent conductive films 72 and 93, and the inner surface of the contact hole 51 can be covered with a stacked film composed of the transparent conductive films 73 and 92.

A transparent conductive film is formed as a thin film of a thickness of 100 nm or less in terms of the need of increasing the transparency thereof. Thus, it is preferable that a contact hole have a tapered shape in cross section in order to enhance the coating performance of the transparent conductive film. The contact holes 51 and 52 are generally formed by dry etching. The contact holes 51 and 52 are formed simultaneously by etching through different film thicknesses. Hence, etching time should be controlled for the contact hole 52 to be formed by etching through a greater thickness. This makes it difficult to form the contact holes 51 and 52 into a tapered shape.

The respective surfaces of the drain electrode 42 and the common interconnect pad 12 should be exposed at the respective bottoms of the contact hole 51 and 52. It is likely that the dry etching will etch the respective surfaces of these metal films excessively in a thickness direction, so that the surfaces of these metal films become rough compared to the conditions thereof at the time of their deposition.

A surface of a metal film forming an interface with the protective insulating film 5 composed of an SiN film may be given a gap (notch) generated in the outer circumference of a contact hole directly below the protective insulating film 5. This reduces the coating performance of a transparent conductive film to be formed in a subsequent step. In this case, a resultant transparent conductive film may become a very thin film, leading to the probability of a step cut of the transparent conductive film.

In (b) portion of FIG. 3 shows a region "X" in an enlarged manner including the bottom surface of the contact hole 51 and its vicinity shown in (a) portion of FIG. 3. As shown in (b) portion of FIG. 3, the inner side surface of the protective insulating film 5 projects slightly further toward the inside of the contact hole 51 than the inner side surface of the planarized film 6. This is for the reason that, when the protective insulating film 5 is dry etched by using a contact hole formed in the planarized film 6 as an etching mask, the inner side surface of the planarized film 6 is etched slightly to be recessed, thereby making the protective insulating film 5 project toward the inside of the contact hole.

The surface of the drain electrode 42 is roughened as a result of the dry etching with the contact hole. This dry etching etches the protective insulating film 5 deeper to generate notches (indicated by arrows), forming the bottom into a "reverse" tapered shape.

If only one of the transparent conductive films 73 and 92 is formed, a film thickness becomes thin at the notched parts of the bottom. In this case, a step cut may be generated easily. In this preferred embodiment, the stacked film composed of the transparent conductive films 73 and 92 is formed. Thus, a large film thickness can be maintained at the notched parts, making it possible to prevent a step cut.

<Manufacturing Method>

A method of manufacturing the liquid crystal display panel 100 of this preferred embodiment of the present invention is described next by using FIGS. 5 to 9 while referring to FIGS. 1 and 2. In the manufacturing method of the liquid crystal display panel, the display and frame regions are formed simultaneously. Meanwhile, the manufacturing method described below is directed to formation of the display region.

First, a first metal film is deposited by sputtering process on one main surface (front surface) of the transparent insulating substrate 10 composed for example of a glass substrate. Examples of a material for the first metal film include aluminum (Al), an alloy containing aluminum, molybdenum (Mo), and chrome (Cr).

Then, a photoresist made of a photosensitive resin is applied on the first metal film for example by spin coating. The applied photoresist is subjected to a first photolithography step including exposure and development, thereby patterning the photoresist into a desirable shape. Then, by using this photoresist as an etching mask, the first metal film is etched into a desirable pattern. Next, the photoresist pattern is removed, thereby forming the gate electrode 11 of (a) portion of FIG. 5 and the common interconnect pad 12 of (b) portion of FIG. 5, and at the same time, forming the scanning line 104 (FIG. 2) and the common interconnect 105 (FIG. 2). Further, in the frame region 102 (FIG. 1), the pulled-out interconnects 111 extending from the scanning lines 104, a bundle of the common interconnects 105, and the mount terminals 107 (FIG. 1) connected to the pulled-out interconnects 111 are formed.

Next, the gate insulating film 2 and a semiconductor film are deposited successively in this order by plasma CVD process so as to cover the transparent insulating substrate 10 entirely on which the gate electrode 11 and the common interconnect pad 12 are formed. The gate insulating film 2 is composed of an SiN film, and the semiconductor film is composed of any one of amorphous silicon, microcrystalline silicon and polycrystalline silicon, or of a silicon semiconductor film made of two or more of these materials, or of an oxide semiconductor film.

A photoresist made of a photosensitive resin is applied on the semiconductor film for example by spin coating. The applied photoresist is subjected to a second photolithography step including exposure and development, thereby patterning the photoresist into a desirable shape. Next, by using this photoresist as an etching mask, the semiconductor film is etched to form the insular semiconductor film 31 including the source, channel, and drain regions as shown in (a) portion of FIG. 5.

Then, a second metal film is deposited by sputtering process so as to cover the entire gate insulating film 2 from above including the semiconductor film 31. Examples of a material for the second metal film include aluminum (Al), an alloy containing aluminum, molybdenum (Mo), and chrome (Cr).

Then, a photoresist made of a photosensitive resin is applied on the second metal film for example by spin coating. The applied photoresist is subjected to a third photolithography step including exposure and development, thereby patterning the photoresist into a desirable shape. Next, by using this photoresist as an etching mask, the second metal film is etched into a desirable pattern. Then, the photoresist pattern is removed, thereby forming the source electrode 41 on the source region of the semiconductor film 31 as shown in (a) portion of FIG. 5, and at the same time, forming the signal line 103 extending from the source electrode 41 and forming the drain electrode 42 on the drain region. Further, in the frame region 102 (FIG. 1), the pulled-out interconnects 110 extending from the signal lines 103, the mount terminals 107 (FIG. 1) connected to the pulled-out interconnects 110, and the external connection terminals 1071 (FIG. 1) are formed.

Figure 6:
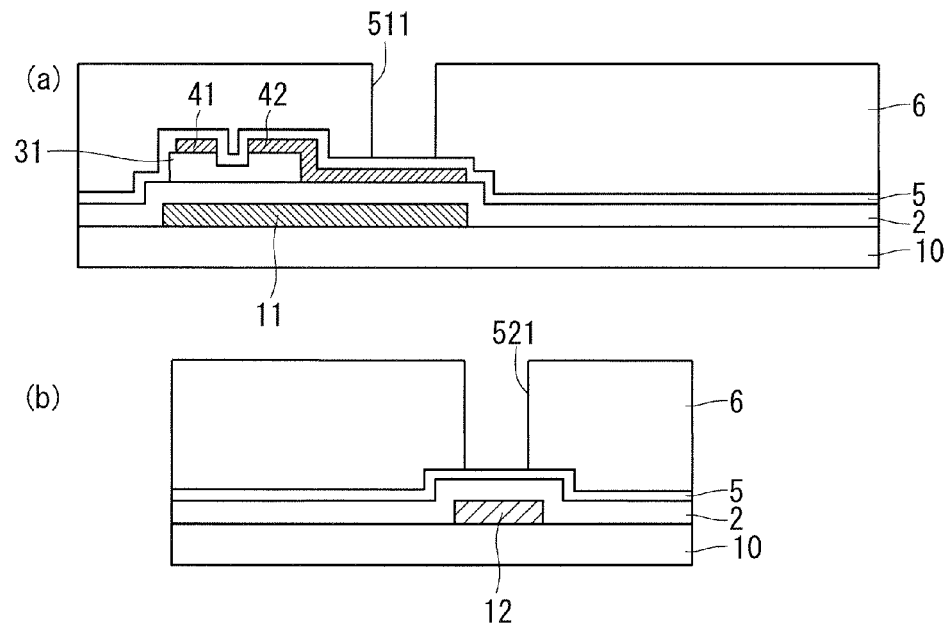

Next, as shown in (a) portion of FIG. 6 and (b) portion of FIG. 6, an SiN film is deposited by plasma CVD process so as to cover the entire transparent insulating substrate 10 on which the aforementioned structures are formed, thereby forming the protective insulating film 5.

Then, an organic resin mainly containing acrylic and the like is applied as a photosensitive resin on the protective insulating film 5 for example by spin coating to form the planarized film 6. The planarized film 6 is subjected to a fourth photolithography step including exposure and development, thereby patterning a contact hole 511 and a contact hole 512 in the planarized film 6 as shown in (a) portion of FIG. 6 and (b) portion of FIG. 6 respectively.

More specifically, the contact hole 511 is formed so as to reach a position above the drain electrode 42 on the semiconductor film 31 and away from the semiconductor film 31. The contact hole 521 is formed so as to reach a position above the common interconnect pad 12. Although not shown in the drawings, contact holes are also formed so as to reach at respective positions above the pulled-out interconnects 110 and the pulled-out interconnects 111 in the frame region 102.

Figure 7:
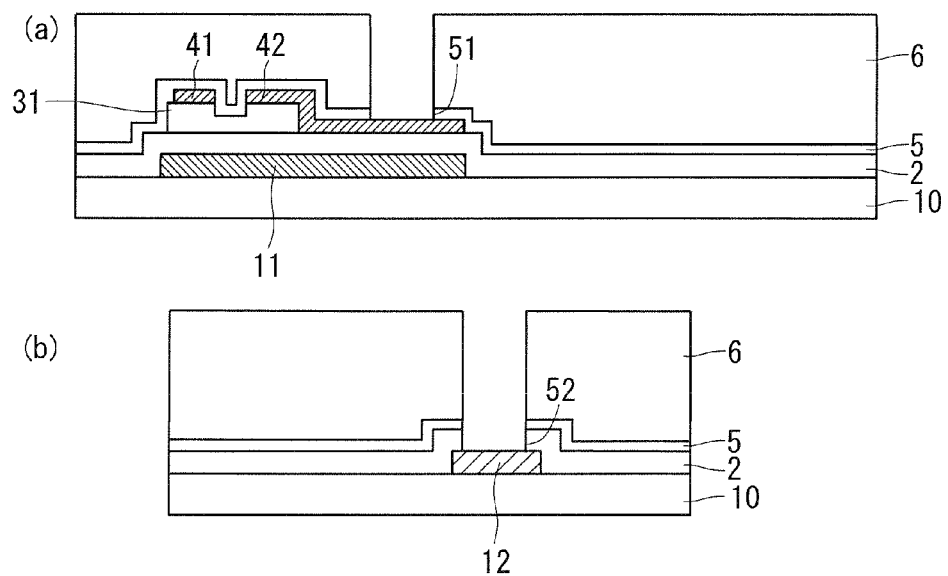

Next, the protective insulating film 5 is dry etched via the contact hole 511 by using the planarized film 6 as an etching mask, thereby forming the contact hole 51 reaching the surface of the drain electrode 42 as shown in (a) portion of FIG. 7. The protective insulating film 5 and the gate insulating film 2 are dry etched via the contact hole 52, thereby forming the contact hole 52 reaching the surface of the common interconnect pad 12 as shown in (b) portion of FIG. 7. Although not shown in the drawings, contact holes are also formed to reach respective positions above the pulled-out interconnects 110 and the pulled-out interconnects 111 in the frame region 102.

The contact holes 51 and 52 are formed simultaneously by etching through different film thicknesses. Hence, etching time is controlled for the contact hole 52 to be formed by etching through a greater thickness, so that etching for the contact hole 52 is finished within the same time as the contact hole 51. The contact holes 51 and 52 are formed into an upright shape and preferably, into a tapered shape in cross section.

Etching time is controlled such that the respective surfaces of the drain electrode 42 and the common interconnect pad 12 are exposed at the bottoms of the contact holes 51 and 52 respectively. Generally, etching time is determined with a margin in consideration of variations in etching speed or variations in film thickness. Specifically, etching proceeds so far as to reach a level of over-etching. Thus, it is likely that dry etching will etch a surface of a metal film more than necessary in a thickness direction to roughen the surface of the metal film, compared to the condition thereof at the time of its deposition. At the same time, the surface of the metal film forming an interface with an SiN film may be given a gap (notch) generated in the outer circumference of a contact hole directly below the SiN film.

Figure 8:
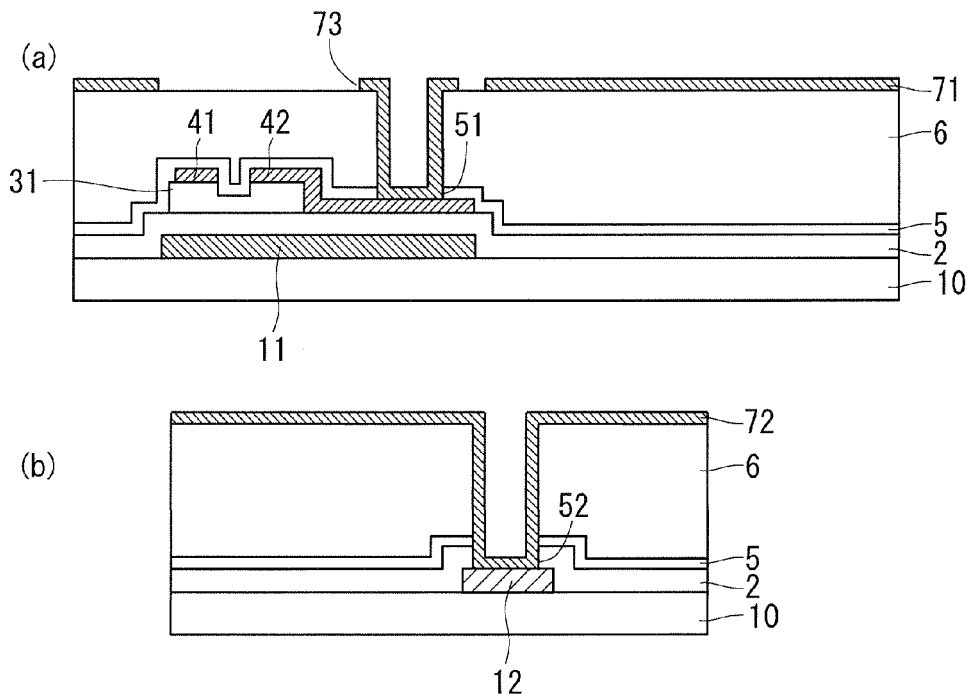
Figure 9:
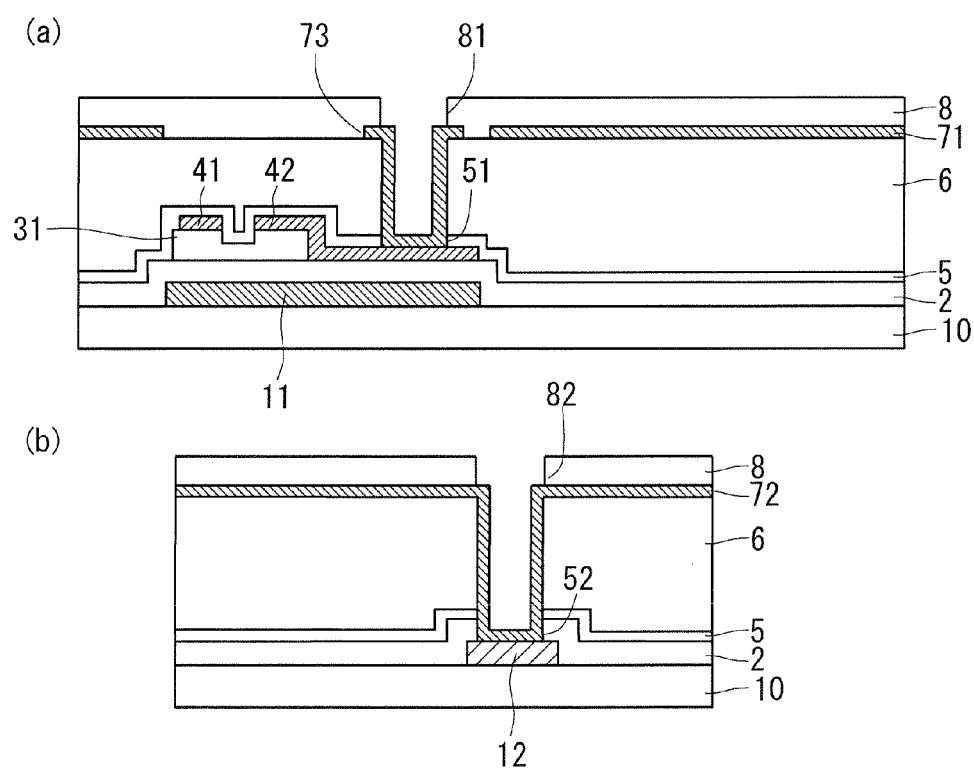

After the contact holes 51 and 52 are formed, the planarized film 6 is not removed but it remains as part of the protective insulating film 5 as shown in (a) portion of FIG. 8 and (b) portion of FIG. 8.

Next, the first transparent conductive film is deposited by sputtering process so as to cover the entire planarized film 6 from above. The first transparent conductive film can be made of ITO or IZO.

The first transparent conductive film is deposited so as to cover a planar region in the surface of the planarized film 6 and the respective inner surfaces of the contact holes 51 and 52.

Then, a photoresist made of a photosensitive resin is applied on the planarized film 6 for example by spin coating. The applied photoresist is subjected to a fifth photolithography step including exposure and development, thereby patterning the photoresist into a desirable shape. Next, by using this photoresist as an etching mask, the first transparent conductive film is etched. Then, the photoresist pattern is removed, thereby patterning the opposed electrode 71 in the planar region in the surface of the planarized film 6 and forming the transparent conductive film 73 on the inner surface of the contact hole 51 and a surrounding of this inner surface, as shown in (a) portion of FIG. 8. The transparent conductive film 73 is electrically independent of the opposed electrode 71. Further, the transparent conductive film 72 extending from the opposed electrode 71 is formed so as to cover the inner surface of the contact hole 52, as shown in (b) portion of FIG. 8.

Next, an SiN film is deposited by plasma CVD process so as to cover the entire planarized film 6 from above on which the opposed electrode 71 is formed, thereby forming the interlayer insulating film 8.

At this time, the SiN film is deposited at a temperature not exceeding the heatproof temperature of the planarized film 6. More specifically, if the planarized film 6 is made of an acrylic resin, the SiN film is deposited at a temperature of about 220° C. or less.

Then, a photoresist made of a photosensitive resin is applied on the interlayer insulating film 8 for example by spin coating. The applied photoresist is subjected to a sixth photolithography step including exposure and development, thereby patterning the photoresist into a desirable shape. Next, by using this photoresist as an etching mask, the interlayer insulating film 8 is dry etched. Then, the photoresist pattern is removed, thereby forming the contact hole 81 continuous with upper part of the contact hole 51 as shown in (a) portion of FIG. 9 and forming the contact hole 82 continuous with upper part of the contact hole 52 as shown in (b) portion of FIG. 9.

The contact holes 81 and 82 are formed to have openings larger than those of the contact holes 51 and 52 under the contact holes 81 and 82 respectively. The interlayer insulating film 8 has a uniform thickness. Thus, it is desirable that the contact holes 81 and 82 be formed into a tapered shape by controlling etching conditions.

The transparent conductive films 73 and 72 exist below the contact holes 81 and 82 respectively. Thus, the transparent conductive films 73 and 72 function as stopper layers during the dry etching, thereby preventing damage on the planarized film 6 to be generated during the etching.

Next, the second transparent conductive film is deposited by sputtering process so as to cover the entire interlayer insulating film 8 from above. The second transparent conductive film can be made of ITO or IZO.

The second transparent conductive film is deposited so as to cover the planar region in the surface of the interlayer insulating film 8, on the respective inner surfaces of the contact holes 81 and 51 continuous with each other, and on the respective respective inner surfaces of the contact holes 82 and 52 continuous with each other Then, a photoresist made of a photosensitive resin is applied on the interlayer insulating film 8 for example by spin coating. The applied photoresist is subjected to a seventh photolithography step including exposure and development, thereby patterning the photoresist into a desirable shape. Next, by using this photoresist as an etching mask, the second transparent conductive film is etched. Then, the photoresist pattern is removed, thereby forming the pixel electrode 91 with slits above the opposed electrode 71. Further, the transparent conductive film 92 extending from the pixel electrode 91 covers the inner side surface of the contact hole 81. The transparent conductive film 92 further covers the transparent conductive film 73 from above that covers the inner surface of the contact hole 51. As a result, the inner side surface and the bottom of the contact hole 51 are covered with the stacked film composed of the transparent conductive films 73 and 92, as shown in (a) portion of FIG. 10.

Figure 10:
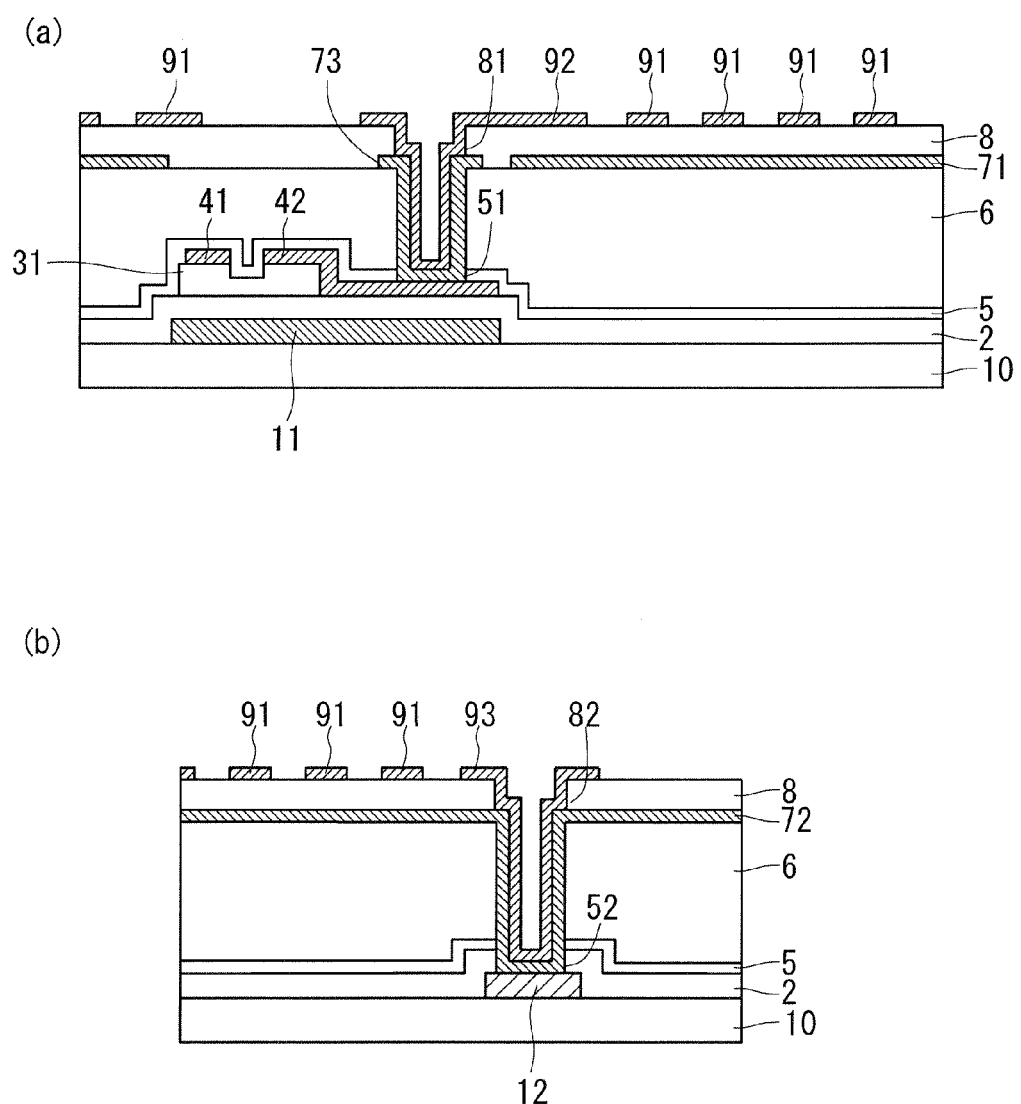

Further, as shown in (b) portion of FIG. 10, the transparent conductive film 93 electrically independent of the pixel electrode 91 covers the inner side surface of the contact hole 82. The transparent conductive film 93 further covers the transparent conductive film 72 from above that covers the inner surface of the contact hole 52. As a result, the inner side surface and the bottom of the contact hole 52 are covered with the stacked film composed of the transparent conductive films 72 and 93.

As described above, in the liquid crystal display panel 100 of this preferred embodiment, in order for the drain electrode 42 and the common interconnect pad 12 not to contact the planarized film 6, the respective inner surfaces of the contact holes 51 and 52 formed in the planarized film 6 on the protective insulating film 5 are each covered with a stacked film composed of transparent conductive films. This can prevent corrosion of the metal films of the drain electrode 42 and the common interconnect pad 12 due to water in the planarized film 6.

Metal films such as the drain electrode 42 and the common interconnect pad 12 do not contact the planarized film 6 directly. Thus, the planarized film 6 can be made of an acrylic resin not having strong force to contact a metal film.

An acrylic resin becomes applicable as a coating film by dissolving in an organic solvent and can be sintered at a relatively low temperature, so that the contact holes 51 and 52 can be formed simultaneously by using a contact hole pattern in the planarized film 6. This allows reduction of manufacturing steps.

The contact holes 51 and 52 are formed by dry etching the protective insulating film 5 via the contact holes 511 and 512 respectively by using the planarized film 6 as an etching mask. This allows reduction of a required alignment margin, compared to that required for forming contact holes separately. As a result, the contact holes can be formed in smaller regions. This can reduce an area occupied by the contact holes in a display region to increase an aperture ratio, thereby achieving enhanced display characteristics.

The respective inner surfaces of the contact holes 51 and 52 are each covered with a stacked film composed of transparent conductive films. Thus, even if the protective insulating film 5 projects at the inner side surfaces of the contact holes 51 and 52 in the planarized film 6 to generate a gap (notch) in the outer circumference of a contact hole directly below the protective insulating film 5, generation of a step cut is suppressed so that the electrical characteristics of a transparent conductive film can be stabilized, thereby achieving high-quality display.

<First Example of Different Way of Application>

In the aforementioned example, the present invention is applied to a contact hole formed in the display region 101 of a liquid crystal display panel. The present invention is also applicable to a contact hole formed in the frame region 102.

The pulled-out interconnects 110 and 111 extending from the signal line 103 and the scanning line 104 respectively in the display region 101 are formed in the frame region 102. Contact holes may be formed to reach parts of the pulled-out interconnects 110 and 11, and interconnects made of the same material as the first or second transparent conductive film and formed in the same layer as the first or second transparent conductive film may be connected via these contact holes. The present invention is applicable to such contact holes.

Figure 11:
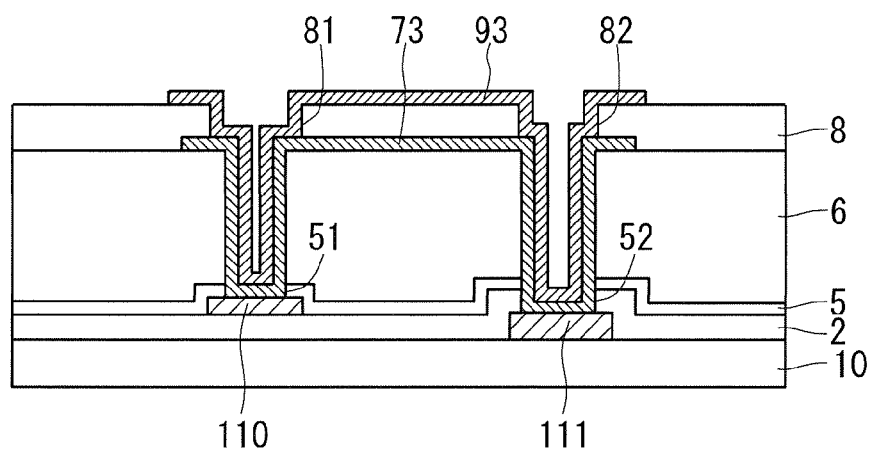
FIGS. 11 and 12 each show an example of a different way of application of the present invention.

A first example of a different way of application of the present invention is described next by using FIG. 11. FIG. 11 is a sectional view showing a connection structure between interconnects. In the frame region 102, the pulled-out interconnects 110 and 111 extending from the signal line 103 and the scanning line 104 respectively in the display region 101 may cross each other or may be electrically connected to each other, for example. This electrical connection can be established via the contact holes 51 and 52 formed in the planarized film 6.

FIG. 11 shows an exemplary structure where the pulled-out interconnects 110 and 111 extending from the signal line 103 and the scanning line 104 respectively are electrically connected via the transparent conductive films 73 and 93.

By referring to FIG. 11, the contact holes 51 and 52 are formed so as to reach upper parts of the pulled-out interconnects 110 and 111 respectively. The contact holes 81 and 82 penetrating the interlayer insulating film 8 are formed above the contact holes 51 and 52 respectively.

The respective inner surfaces of the contact holes 81 and 51 continuous with each other are covered with a stacked film composed of the transparent conductive films 73 and 93, and the respective inner surfaces of the contact holes 82 and 52 continuous with each other are covered with a stacked film composed of the transparent conductive films 73 and 93. Further, the transparent conductive film 73 in the continuous contact holes 81 and 51 and the transparent conductive film 73 in the continuous contact holes 82 and 52 are connected via the transparent conductive film 73 on the planarized film 6.

The transparent conductive film 93 in the continuous contact holes 81 and 51 and the transparent conductive film 93 in the continuous contact holes 82 and 52 are connected via the transparent conductive film 93 on the interlayer insulating film 8.

The aforementioned parallel connection between the interconnects composed of the transparent conductive films can reduce an interconnect resistance. Further, the interconnects in the frame region 102 can be connected in the same steps as the step of manufacturing the contact holes and the step of manufacturing the transparent conductive films in the display region 101. This can reduce manufacturing steps, compared to the case where the interconnects in the frame region 102 are connected in a different manufacturing step.

<Second Example of Different Way of Application>

The mount terminals 107 are formed at respective ends of the pulled-out interconnects 110 and 111, and the external connection terminals 1071 are connected to the mount terminals 107. The present invention is also applicable to contact holes reaching the mount terminals 107 and the external connection terminals 1071.

By forming the contact holes in the frame region 102 into the same shape as that of the contact holes in the display region 101, the yield and reliability of an entire liquid crystal display panel can be enhanced.

A second example of a different way of application of the present invention is described next by using FIG. 12. In the frame region 102, the mount terminals 107 are formed at respective end portions of the pulled-out interconnects 110 and 111 extending from the signal line 103 and the scanning line 104 respectively in the display region 101. The IC chip 109 for signal control is connected to the mount terminals 107.

Figure 12:
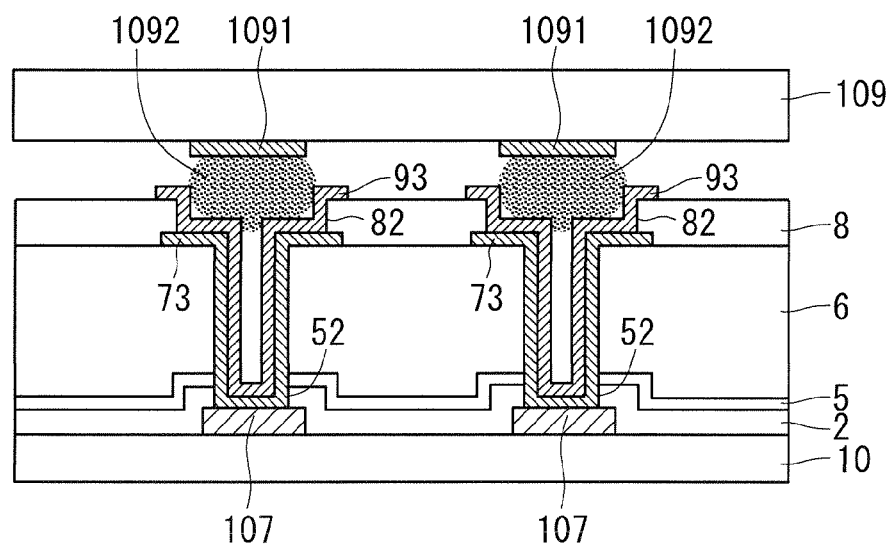

FIG. 12 shows a connection structure between the mount terminals 107 and the IC chip 109. The mount terminals 107 and the electrode terminals 1091 of the IC chip 109 are electrically connected via the transparent conductive films 73 and 93.

By referring to FIG. 12, the contact holes 52 are formed so as to reach upper parts of the mount terminals 107. The contact holes 82 penetrating the interlayer insulating film 8 are formed above the corresponding contact holes 52.

The respective inner surfaces of the contact holes 82 and 52 continuous with each other are covered with a stacked film composed of the transparent conductive films 73 and 93.

Bumps 1092 composed of resin containing conductive particles are provided to be connected to the electrode terminals 1091 of the IC chip 109. The IC chip 109 is placed such that the bumps 1092 contact the inner sides of the contact holes 82 the inner surfaces of which are covered with the transparent conductive film 93. The IC chip 109 is bonded under pressure to flattened out the bumps 1092, thereby mounting the IC chip 109 on the liquid crystal display panel 100.

In this way, the mount terminals 107 and the electrode terminals 1091 of the IC chip 109 are electrically connected via the contact holes same as those in the display region 101. This increases the mechanical strength of the contact holes to achieve higher strength during pressure bonding of the IC chip 109.

The mount terminals 107 are composed of the same metal film as the signal line 103 or the scanning line 104 and are covered with a transparent conductive film to suppress corrosion thereof due to moisture (water) in ambient air. The mount terminals 107 are covered with a stacked film composed of the transparent conductive films 73 and 93, so that corrosion of the mount terminals 107 can be suppressed more effectively. This suppresses generation of a defective at a later stage to maintain a quality, thereby realizing cost reduction.

The pixel electrode has been described as an upper electrode and the opposed electrode has been described as a lower electrode. Alternatively, the pixel electrode may be a lower electrode and the opposed electrode may be an upper electrode. The upper electrode of this case is given a slit in order to generate an electric field in an upward direction (direction of a liquid crystal layer).

The opposed electrode is described as having an integral structure extending through the display region as described in the preferred embodiment. The opposed electrode can be divided per pixel into sections, and these sections may be electrically connected via a contact hole.

The preferred embodiment of the present invention can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display panel, comprising:
 a transparent insulating substrate;
 a signal line and a scanning line arranged in a display region on said transparent insulating substrate and crossing each other in a matrix;
 a thin-film transistor formed at an intersection between said signal line and said scanning line;
 a common interconnect arranged so as to extend in parallel with said signal line or said scanning line;
 a protective insulating film arranged so as to cover said thin-film transistor, said signal line, and said scanning line from above;
 a first insulating film that covers said protective insulating film from above;
 a lower electrode and an upper electrode arranged to be opposed to each other above said first insulating film, said lower and upper electrodes being arranged one above the other and said upper electrode having a plurality of slits; and
 a first contact hole that penetrates at least said first insulating film and said protective insulating film to reach a surface of said common interconnect,
 wherein said thin-film transistor includes:
  a gate electrode arranged on said transparent insulating substrate;
  a gate insulating film arranged so as to cover said transparent insulating substrate from above including said gate electrode;
  a semiconductor film arranged on said gate insulating film and at a position opposed to said gate electrode; and
  a source electrode and a drain electrode arranged on a source region and a drain region of said semiconductor film so as to contact said source and drain regions respectively,
 said liquid crystal display panel further comprising a second contact hole that penetrates said first insulating film and said protective insulating film to reach a surface of said drain electrode,
 wherein one of said first contact hole and said second contact hole has a bottom and an inner side surface covered with a first stacked film composed of a first transparent conductive film that extends from said lower electrode, is made of the same material as said lower electrode, and is integrally formed with said lower electrode to constitute a single-layer sequential pattern with said lower electrode and a second transparent conductive film that is electrically independent of said upper electrode and is made of the same material as said upper electrode,
 side surfaces of said first insulating film and said protective insulating film are exposed at said inner side surface,
 said first transparent conductive film in said first stacked film is located so that a first surface of said first transparent conductive film directly contacts said second transparent conductive film, and that a second surface of said first transparent conductive film, opposite to said first surface directly contacts said side surfaces of said first insulating film and said protective insulating film exposed at said inner side surface, and one of said surfaces of said common interconnect and said drain electrode, said surfaces being exposed at said bottom, said protective insulating film includes an inorganic insulating film, and said first insulating film includes a light-sensitive organic resin film.

2. The liquid crystal display panel according to claim 1, wherein the other of said first contact hole and said second contact hole has a bottom and an inner side surface covered with a second stacked film composed of a third transparent conductive film that is electrically independent of said lower electrode and is made of the same material as said lower electrode and a fourth transparent conductive film that extends from said upper electrode, is made of the same material as said upper electrode, and is integrally formed with said upper electrode to constitute a single-layer sequential pattern with said upper electrode.

3. The liquid crystal display panel according to claim 2, wherein said first transparent conductive film of said first stacked film is a film extending from said lower electrode, being made of the same material as said lower electrode, and being integrally formed with said lower electrode to constitute a single-layer sequential pattern with said lower electrode, said second transparent conductive film of said first stacked film is a film electrically independent of said upper electrode, said third transparent conductive film of said second stacked film is a film electrically independent of said lower electrode, and said fourth transparent conductive film of said second stacked film is a film extending from said upper electrode, is made of the same material as said upper electrode, and is integrally formed with said upper electrode to constitute a single-layer sequential pattern with said upper electrode.

4. The liquid crystal display panel according to claim 2, comprising an interlayer insulating film arranged between said upper and lower electrodes, wherein said one of said first contact hole and said second contact hole is said first contact hole, said other of said first contact hole and said second contact hole is said second contact hole, said interlayer insulating film includes a third contact hole formed at a position corresponding to upper part of said first contact hole, said third contact hole penetrating said interlayer insulating film to be continuous with said first contact hole, and a fourth contact hole formed at a position corresponding to upper part of said second contact hole, said fourth contact hole penetrating said interlayer insulating film to be continuous with said second contact hole, said second transparent conductive film of said first stacked film extends into said first contact hole via said third contact hole, said fourth transparent conductive film of said second stacked film extends into said second contact hole via said fourth contact hole, and said third and fourth contact holes have openings larger in a plane than those of said first and second contact holes respectively.

5. The liquid crystal display panel according to claim 2, wherein said one contact hole is said first contact hole, said other contact hole is said second contact hole, said gate electrode and said common interconnect are made of the same material and arranged in the same layer, said gate insulating film covers said common interconnect, and said first contact hole penetrates said gate insulating film to reach a surface of said common interconnect.

6. The liquid crystal display panel according to claim 5, wherein said signal line is made of the same material as said source electrode, arranged in the same layer as said source electrode, and connected to said source electrode, and said scanning line is made of the same material as said gate electrode, arranged in the same layer as said gate electrode, and connected to said gate electrode, said liquid crystal display panel further comprising:

a first pulled-out interconnect and a second pulled-out interconnect arranged in an outer peripheral region of said display region, said first and second pulled-out interconnects extending from said signal line and said scanning line respectively;

a first terminal electrode and a second terminal electrode connected to said first and second pulled-out interconnects respectively; and at least one of a fifth contact hole and a sixth contact hole, said fifth contact hole penetrating said first insulating film, said protective insulating film and said gate insulating film to reach a surface of said second terminal electrode, said sixth contact hole penetrating said first insulating film and said protective insulating film to reach a surface of first terminal electrode, wherein said fifth contact hole has a bottom and an inner side surface covered with said first stacked film composed of said first and second transparent conductive films, and said sixth contact hole has a bottom and an inner side surface covered with said second stacked film composed of said third and fourth transparent conductive films.

7. A method of manufacturing the liquid crystal display panel as recited in claim 2, comprising the steps of:

(a) forming said first contact hole and said second contact hole simultaneously, said first contact hole being formed so as to penetrate at least said first insulating film and said protective insulating film to reach a surface of said common interconnect, said second contact hole being formed so as to penetrate said first insulating film and said protective insulating film to reach a surface of said drain electrode;

(b) covering said bottom and said inner side surface of said first contact hole and covering said bottom and said inner side surface of said second contact hole simultaneously with said first transparent conductive film made of the same material as said lower electrode; and (c) covering an inner surface of said first contact hole and covering an inner surface of said second contact hole simultaneously with said second transparent conductive film made of the same material as said upper electrode, said respective inner surfaces of said first and second contact holes being covered with said first transparent conductive film.

8. The method according to claim 7, further comprising:

(d) after said step (a), forming said lower electrode on said first insulating film;

(e) after said step (d), forming an interlayer insulating film so as to cover said lower electrode from above;

(f) forming a third contact hole and a fourth contact hole simultaneously, said third contact hole being formed at a position corresponding to upper part of said first contact hole so as to penetrate said interlayer insulating film to be continuous with said first contact hole, said fourth contact hole being formed at a position corresponding to upper part of said second contact hole so as to penetrate said interlayer insulating film to be continuous with said second contact hole; and (g) after said step (f), forming said upper electrode on said interlayer insulating film, wherein performing said step (d) realizes said step (b) simultaneously, performing said step (g) realizes said step (c) simultaneously, thereby making said second transparent conductive film extend into said first contact hole via said third contact hole and extend into said second contact hole via said fourth contact hole, and said step (f) includes a step of making said third and fourth contact holes have openings larger in a plane than those of said first and second contact holes respectively.

9. The liquid crystal display panel according to claim 1, wherein said protective insulating film includes an SiN film.

10. The liquid crystal display panel according to claim 1, wherein said first insulating film is not in direct contact with said common interconnect and said drain electrode.

11. The liquid crystal display panel according to claim 1, wherein surfaces of said inorganic insulating film and said light-sensitive organic resin film are exposed at said inner side surface, and said second surface of said first transparent conductive film directly contacts said inorganic insulating film and said light-sensitive organic resin film.

* * * * *